(12) United States Patent
Vengertsev et al.

(10) Patent No.: US 12,443,834 B2
(45) Date of Patent: Oct. 14, 2025

(54) BINARY NEURAL NETWORK IN MEMORY

(71) Applicant: Micron Technology, Inc., Boise, ID (US)

(72) Inventors: Dmitry Vengertsev, Boise, ID (US); Seth A. Eichmeyer, Boise, ID (US); Jing Gong, Kirkland, WA (US); John Christopher M. Sancon, Boise, ID (US); Nicola Ciocchini, Boise, ID (US); Tom Tangelder, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1024 days.

(21) Appl. No.: 17/319,765

(22) Filed: May 13, 2021

(65) Prior Publication Data
US 2022/0366224 A1    Nov. 17, 2022

(51) Int. Cl.
G06N 3/063    (2023.01)
G06N 3/04     (2023.01)
G11C 11/54    (2006.01)
G11C 13/00    (2006.01)

(52) U.S. Cl.
CPC ............... G06N 3/063 (2013.01); G06N 3/04 (2013.01); G11C 11/54 (2013.01); G11C 13/0004 (2013.01)

(58) Field of Classification Search
CPC .......... G06N 3/063; G06N 3/04; G11C 11/54; G11C 13/0004
See application file for complete search history.

(56) References Cited

U.S. PATENT DOCUMENTS

| | | | |
|---|---|---|---|
| 10,089,577 B2 | 10/2018 | Umuroglu et al. | |
| 10,586,151 B1* | 3/2020 | Teig | G06N 3/082 |
| 10,902,317 B2* | 1/2021 | Hou | G06N 3/04 |
| 11,055,872 B1* | 7/2021 | Chen | G06V 10/764 |
| 2014/0192588 A1* | 7/2014 | Lee | G11C 13/004 |
| | | | 365/148 |
| 2018/0315473 A1 | 11/2018 | Yu et al. | |
| 2019/0080755 A1 | 3/2019 | Seo et al. | |
| 2019/0303750 A1* | 10/2019 | Kumar | G06F 7/5443 |
| 2020/0302297 A1* | 9/2020 | Jaganathan | G06V 10/454 |

(Continued)

FOREIGN PATENT DOCUMENTS

| | | |
|---|---|---|
| CN | 109657787 | 4/2019 |
| WO | 2021050590 | 3/2021 |

OTHER PUBLICATIONS

Sungho Kim et al., 'Impact of Synaptic Device Variations on Classification Accuracy in a Binarized Neural Network', Scientific Reports, vol. 9, Article No. 15237, Oct. 23, 2019, 8 pages.

(Continued)

*Primary Examiner* — Beau D Spratt
(74) *Attorney, Agent, or Firm* — Brooks, Cameron & Huebsch, PLLC

(57) ABSTRACT

Apparatuses and methods can be related to implementing a binary neural network in memory. A binary neural network can be implemented utilizing a resistive memory array. The memory array can comprise programmable memory cells that can be programed and used to store weights of the binary neural network and perform operations consistent with the binary neural network. The weights of the binary neural network can correspond to non-zero values.

17 Claims, 6 Drawing Sheets

(56) References Cited

U.S. PATENT DOCUMENTS

| | | |
|---|---|---|
| 2020/0311512 A1 | 10/2020 | Choi et al. |
| 2021/0174182 A1* | 6/2021 | Greenberg .............. G11C 11/54 |
| 2021/0256389 A1* | 8/2021 | Gross ..................... G06N 3/063 |
| 2021/0350242 A1* | 11/2021 | Li .......................... G06N 3/063 |
| 2022/0108759 A1* | 4/2022 | Tran ........................ G11C 7/16 |
| 2022/0358354 A1* | 11/2022 | Hoang .................... G06N 3/08 |

OTHER PUBLICATIONS

Nina Narodytska et al., 'Verifying properties of binarized deep neural networks', AAAI'18/IAAI'18/EAAI'18: Proceedings of the Thirty-Second AAAI Conference on Artificial Intelligence and Thirtieth Innovative Applications of Artificial Intelligence Conference and Eighth AAAI Symposium on Educational Advances in Artificial Intelligence, Article No. 810, Feb. 2018, 11 pages.

\* cited by examiner

BINARY NEURAL NETWORK IN MEMORY

TECHNICAL FIELD

The present disclosure relates generally to memory, and more particularly to apparatuses and methods associated with implementing a binary neural network in memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

The present disclosure includes apparatuses and methods related to implementing a binary neural network in memory. A binary neural network can be implemented in memory utilizing a memory array.

An artificial neural network (ANN) can comprise a plurality of nodes organized into layers of the ANN. The nodes can be coupled to each other. Each coupling between nodes can be assigned a weight. The weights of ANN can be assigned a floating point number as a value. The layers, nodes, and weights can be used to generate an output from an input. In various examples, the layers of the ANN can be convolution layers. An ANN having convolution layers can be referred to as a convolution neural network (CNN). As used herein, a CNN utilizes convolution in place of matrix multiplication in at least one of the layers of the CNN. Convolution describes a mathematical operation of an integral that expresses the amount of overlap of one function as it is shifted over another function. A convolution operation provides the integral of the product of the two functions after one is reversed and shifted.

However, implementing a CNN, comprising weights having floating-point values, in memory can have a number of disadvantages. For example, implementing a CNN in memory may be inefficient. Implementing a CNN in memory may include storing the weights of the CNN in a memory array which may be inefficient based on the quantity of memory cells that are needed to store the weights. For instance, multiple memory cells may be needed to store a single weight. Furthermore, a memory array may not be used to perform the operations needed to process data using a CNN. The memory cells of a memory array may not be used to perform operations such as multiplication operations where the weights are floating-point values. That is, the memory cells may not be used to generate an output of the multiplication operations where the weights are floating-point values.

Aspects of the present disclosure address the above and other deficiencies. The CNN can be converted into a first binary neural network (BNN) where the weights of the BNN are binary values $\{0,1\}$. The first BNN can be converted into a second BNN wherein the weights of the second BNN are also binary values but comprise the values $\{g1, g2\}$. As used herein, the values g1 and g2 are two different non-zero values.

Figure 4:
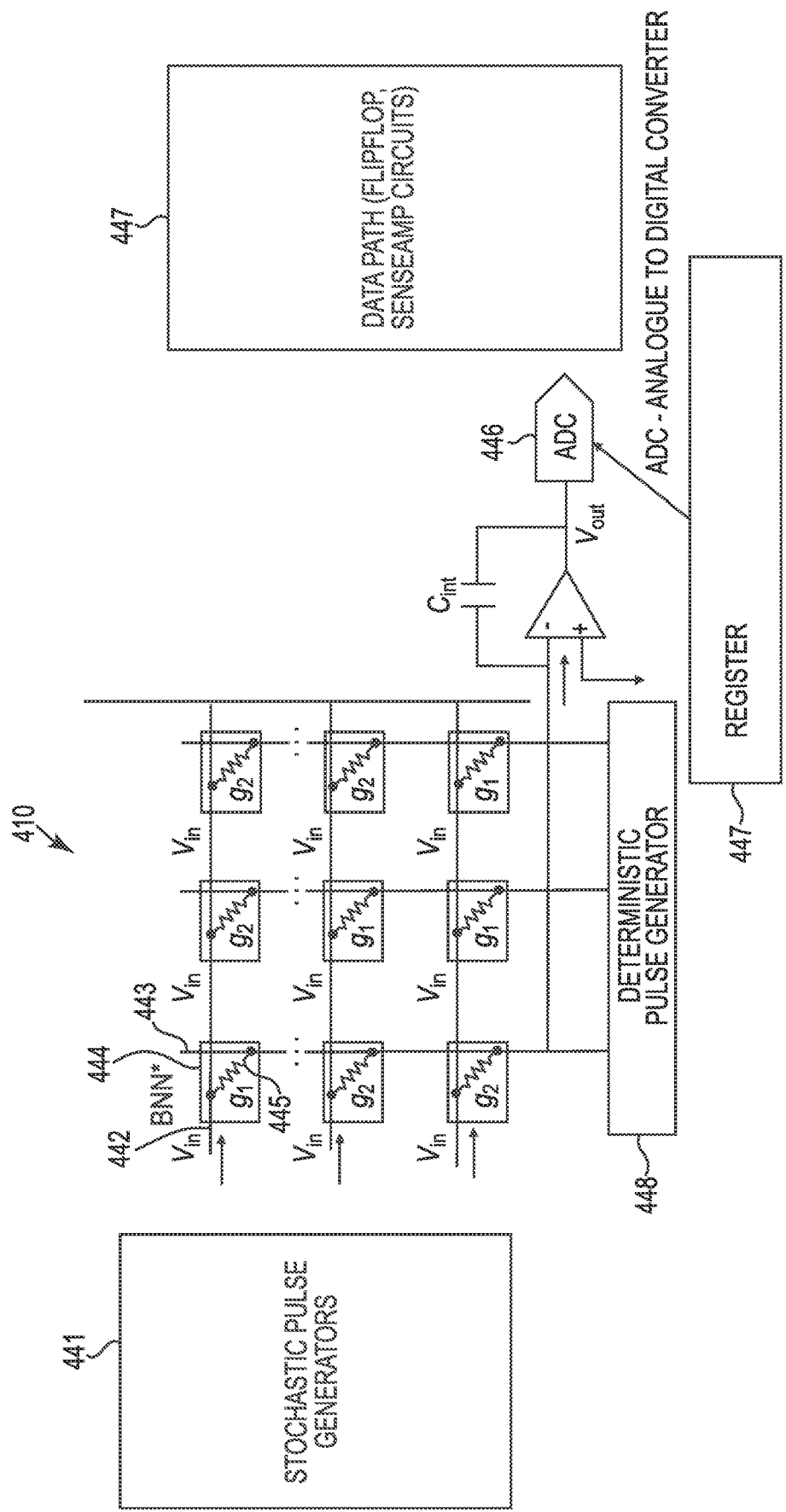
FIG. 4 illustrates a block diagram of memory cells for executing a binary neural network.

A BNN that includes weights having binary values can be implemented in memory cells of a memory array. For example, each of the weights of the BNN can be stored in a single memory cell of the memory array as a respective one of two states of the memory cell. The memory cells of the memory array can be used to perform multiplication operations on the weights stored in the memory cells. FIG. 4 provides an example of performing operations (e.g., multiplication operations) utilizing memory cells of a memory array. Implementing a BNN in memory cells of the memory array can offload the implementation of the BNN from a host.

The figures herein follow a numbering convention in which the first digit or digits correspond to the drawing figure number and the remaining digits identify an element or component in the drawing. Similar elements or components between different figures may be identified by the use of similar digits. For example, 220 may reference element "20" in FIG. 2, and a similar element may be referenced as 320 in FIG. 3. Analogous elements within a Figure may be referenced with a hyphen and extra numeral or letter. See, for example, elements 331-1, 331-2, 331-3 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
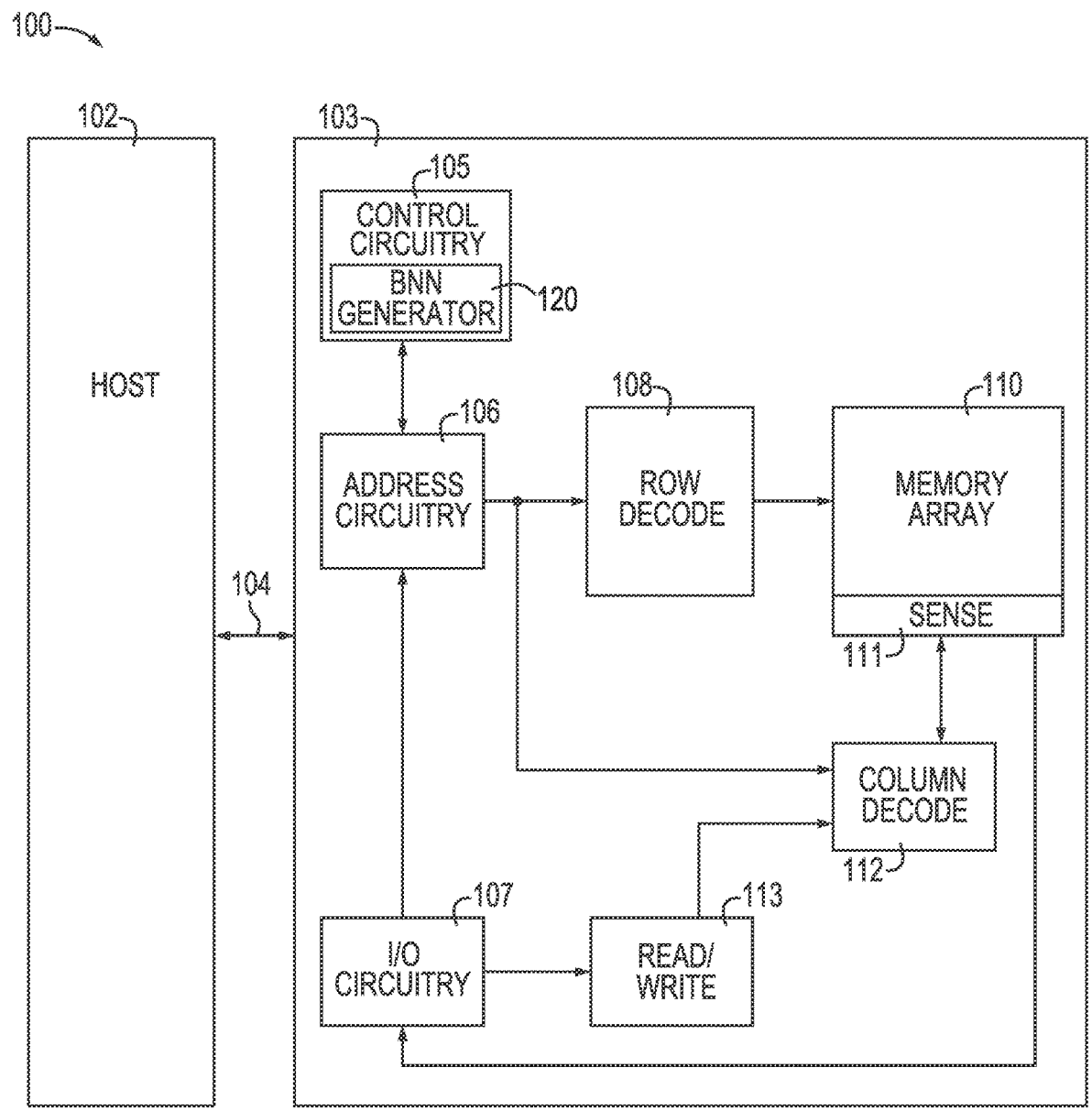
FIG. 1 is a block diagram of an apparatus in the form of a computing system including a memory device in accordance with a number of embodiments of the present disclosure.

FIG. 1 is a block diagram of an apparatus in the form of a computing system 100 including a memory device 103 in accordance with a number of embodiments of the present disclosure. As used herein, a memory device 103, memory array 110, and/or a host 102, for example, might also be separately considered an "apparatus."

In this example, the computing system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. Host 102 can include a number of processing resources (e.g., one or more processors, microprocessors, or some other type of controlling circuitry) capable of accessing memory 102. The computing system 100 can include separate integrated circuits, or both the host 102 and the memory device 103 can be on the same integrated circuit. For example, the host 102 may be a system controller of a memory system comprising multiple memory devices 103, with the system controller providing access to the respective memory devices 103 by another processing resource such as a central processing unit (CPU).

For clarity, the computing system 100 has been simplified to focus on features with particular relevance to the present disclosure. The memory array 110 can be a DRAM array, SRAM array, STT RAM array, PCRAM array, TRAM array, RRAM array, NAND flash array, NOR flash array, and/or resistive or phase-changing array (e.g., 3DXPoint array), for instance. The array 110 can comprise memory cells arranged in rows coupled by access lines (which may be referred to herein as word lines or select lines) and columns coupled by sense lines (which may be referred to herein as digit lines or data lines). Although the memory array 110 is shown as a single memory array, the memory array 110 can represent a plurality of memory array arranged in banks of the memory device 103.

The memory device 103 includes address circuitry 106 to latch address signals provided over the interface 104. The interface can include, for example, a physical interface employing a suitable protocol (e.g., a data bus, an address bus, and a command bus, or a combined data/address/command bus). Such protocol may be custom or proprietary, or the interface 104 may employ a standardized protocol, such as Peripheral Component Interconnect Express (PCIe), Gen-Z interconnect, cache coherent interconnect for accelerators (CCIX), or the like. Address signals are received and decoded by a row decoder 108 and a column decoder 112 to access the memory arrays 110. Data can be read from memory arrays 110 by sensing voltage and/or current changes on the sense lines using sensing circuitry 111. The sensing circuitry 111 can be coupled to the memory arrays 110. Each memory array and corresponding sensing circuitry can constitute a bank of the memory device 103. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory arrays 110 or read data from the memory arrays 110. As an example, the circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device. Data can be provided to the memory array 110 and/or from the memory array via the data lines coupling the memory array 110 to the I/O circuitry 107.

In various instances, the memory array 110 can be a resistive memory array. The resistive memory array can be a resistive programmable device. That is, the memory array 110 can be programmed by modifying the resistance of the memory cells that comprises the memory array 110. The memory cells can be programed to a specific resistance (or conductance). With respect to programming the memory cells and/or representing values with the memory cells, the terms resistance and conductance are used interchangeably herein since any change in resistance is accompanied by a proportional change in conductance. The resistance of the memory cells can represent values that can be used in the performance of operations. For instance, the resistance of the memory cells can be used to perform a multiplication operation, among other types of operations.

In various examples, the resistance of the memory cells can be programmed to represent weight values and bias values of a neural network. The ability to program the resistance of the memory cells can contribute to the ability to execute a BNN utilizing a limited number of banks of the memory array 110. The results of the operations performed at the layers of the BNN can be converted to voltage signals utilizing an analog-to-digital converters (ADCs) described in FIG. 4. Although the pulse generators and ADCs can be coupled directly to the memory array 110, in some embodiments the pulse generators and/or ADCs can be coupled to the memory array 110 via the sensing circuitry 111, the row decoder 108, or the column decoder 112.

Although the memory array 110 can be a resistive memory array, the memory array 110 can also be referred to as a resistive or phase-change memory array comprising resistive or phase-change memory cells. That is, an example of a resistive memory array is a resistive or phase-change memory array.

The control circuitry 105 can include a BNN generator 120. The BNN generator 120 is hardware and/or firmware for generating a BNN that can be executed using the memory array 110. For example, the host 102, can provide instructions, via the interface 104. The instructions can be received by the memory system 103. The control circuitry 105 can cause the BNN generator 120 to generate a BNN responsive to receipt of the instructions. The BNN generator 120 can cause a number of operations to be performed to convert an ANN to a BNN.

For example, the BNN generator 120 can access the ANN from the memory array 110 and/or can receive the ANN from the host 102. The BNN generator 120 can output a BNN that can be stored in the memory array 110. As used herein, the BNN generator 120 can cause a BNN to be outputted such that the BNN is generated and is stored to the memory array 110. Outputting a BNN can include outputting the weights of the BNN and/or the different variables of the BNN such as the biases, among other possible variables of the BNN. The BNN generator 120 can then cause the BNN to be programmed into the memory array 110. The BNN generator 120 and/or a different circuitry of the control circuitry 105 can cause the BNN to be executed by providing an input to the memory array 110. The input can be provided to the BNN and processed by the BNN using the memory cells to generate an output.

Figure 2:
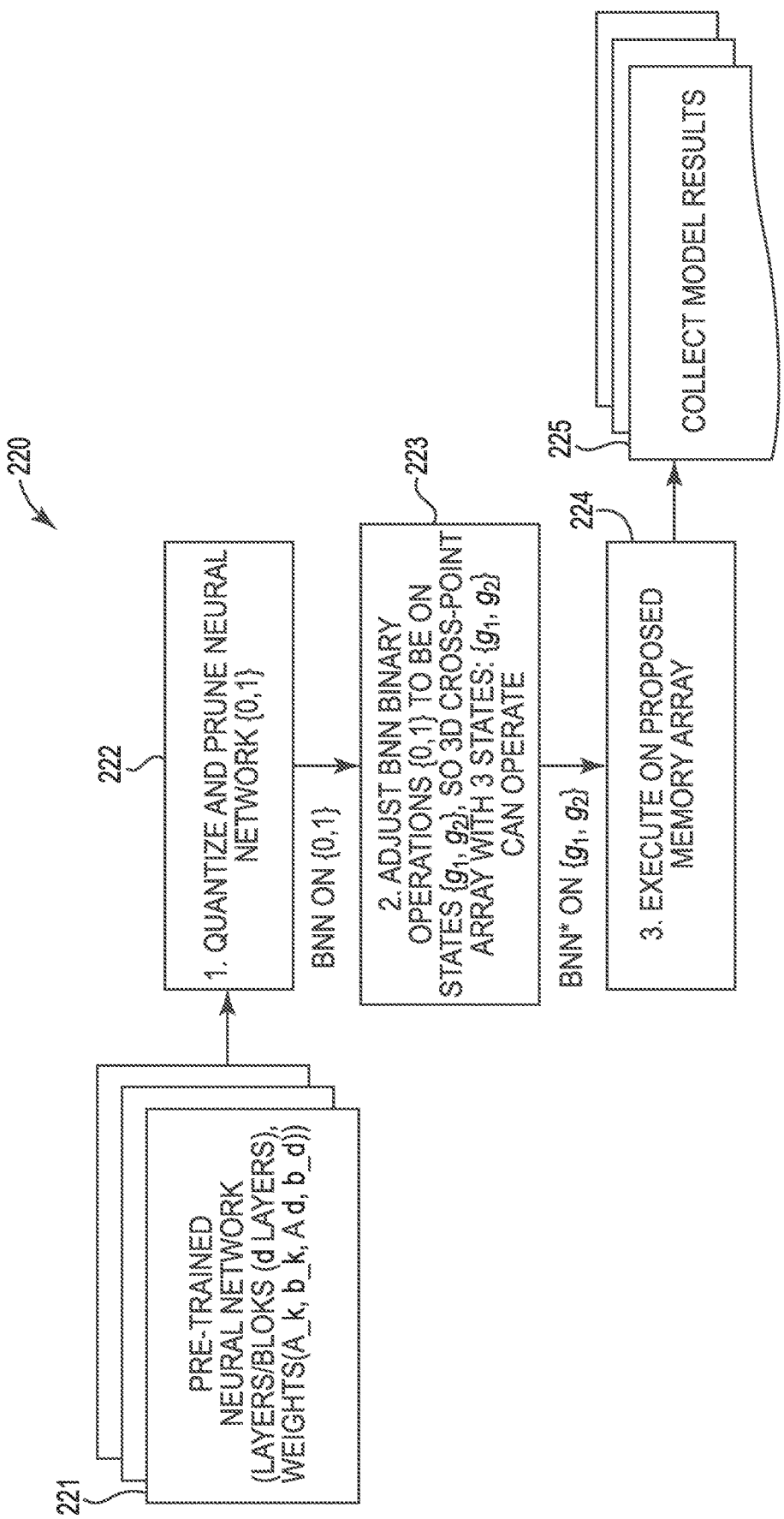
FIG. 2 illustrates a flow diagram for generating a binary neural network in accordance with a number of embodiments of the present disclosure.

FIG. 2 illustrates a flow diagram for generating a binary neural network in accordance with a number of embodiments of the present disclosure. The flow diagram can be executed by a BNN generator 220. The BNN generator 220 can, at block 221, access a pre-trained neural network. The pre-trained neural network can be, for example, an ANN such as a CNN. A CNN can be pre-trained given that the weights of the CNN have not been trained but rather are predefined and are a starting point for the training of the CNN. In various examples, a trained CNN can also be provided to the BNN generator 220.

The pre-trained CNN can comprise a plurality (d) of layers. Each of the d layers can represent a block of the pre-trained CNN. Accessing a pre-trained CNN can also include accessing the weights of the CNN. The weights of the CNN can comprise $A_k$, $b_k$, $A_d$, $b_d$. As used herein, each of $A_k$, $b_k$, $A_d$, $b_d$ represent a number of vectors that comprise a plurality of weights of a linear layer of the BNN generator 220.

At block 222, the BNN generator 220 can quantize or quantize and prune the CNN to generate a first BNN having weights with binary values {0, 1}. Quantizing the CNN can include approximating a neural network that uses floating-point values by a neural network that uses low bit width numbers. As used herein, low bit width numbers include low-precision weights and low bit width activation functions. Low bit weights can include {0, 1}, {−1, 1}, or {g1, g2}, among other examples. Executing a neural network that uses low bit width numbers can reduce both the memory requirements and computational costs of using the neural network. The floating-point values can be quantized to binary values {0, 1}. Although quantizing the CNN is described as quantizing floating point values, the weights of the CNN can be quantized from different types of values to the binary values {0, 1}. Pruning the weights of the CNN can include eliminating connections from the nodes of the CNN such that weights for a given connection are not needed and as such are not used. The first BNN can be generated from the CNN.

At block 223, a second BNN can be generated from the first BNN. The first BNN may not be executable using the memory array given that multiplication operations cannot be performed using the memory cells of the memory array where the memory cells store a 0-value. That is, resistive, phase-changing, or similar memory cells (e.g., 3DXP memory cells) that store a 0-value cannot be used to perform multiplication operations. If a 0-value is stored in a memory cell coupled to a word line, then other memory cells coupled to the word line are not able to be activated given that all current is synched. As such, the second BNN is generated having weights with one of the two values {g1, g2}. Both of the binary values {g1, g2} of the weights of the second BNN can be utilized to perform multiplication operations using the memory cells of the memory array.

The binary values {g1, g2} of the second BNN can be non-zero values. As used herein, the binary values representing weights of BNNs can represent a conductance of memory cells such that a 0-value can represent lower non-zero conductance while a 1-value represents a maximum conductance. The binary values {g1, g2} can represent conductance values of the memory cells. The binary values {g1, g2} can be greater than a 0-value. In various instances, the binary values {g1, g2} can be less than a 1-value such that $0<g1<g2<1$. In other examples, the binary values {g1, g2} can be less than or equal to a 1-value such that $0<g1<g2\leq 1$. The generation of the second BNN is further described in FIG. 3.

At block 224, the BNN generator 220 can cause the second BNN to be executed on a resistive or phase-change array. For example, the BNN generator 220 can cause the weights of the second BNN to be stored in the memory cells of the resistive or phase-change array. An input can be provided to the memory cells of the resistive or phase-change array to generate an output. The input can be an image and/or natural language, for example. The output can be a classification, for example. At block 225, the output of the second BNN can be stored back to the resistive or phase-change array and/or can be provided to a host such as host 102 of FIG. 1.

Figure 3:
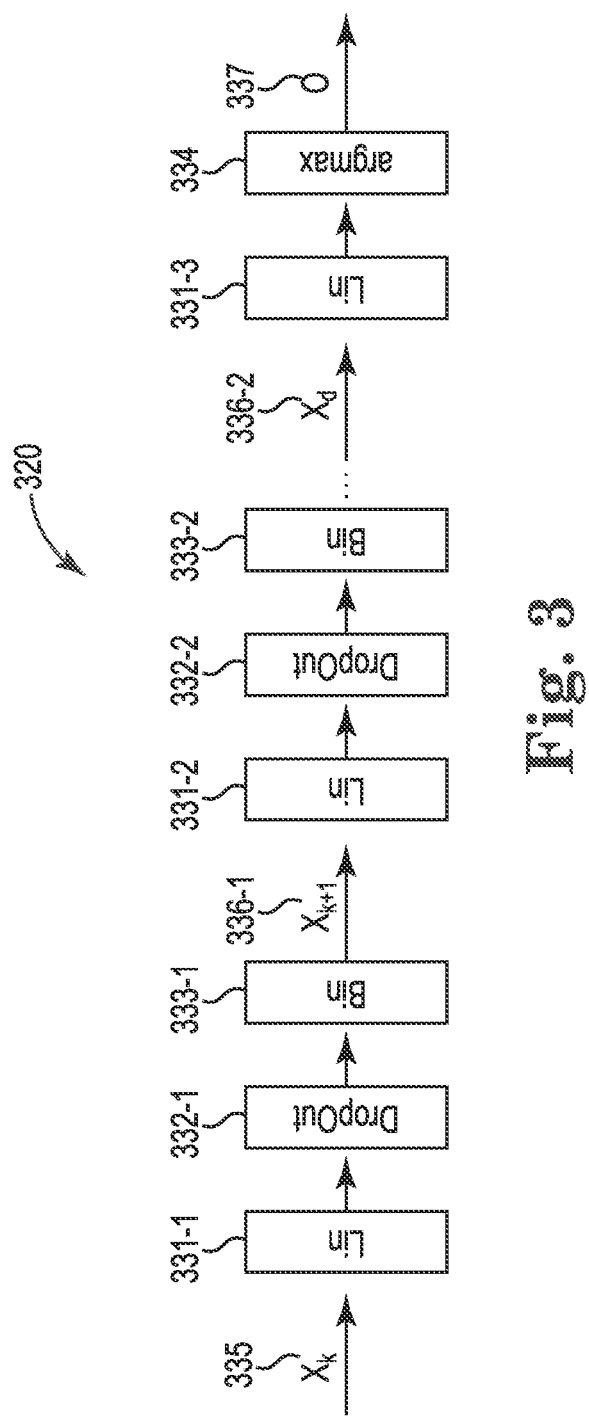
FIG. 3 illustrates a flow diagram for generating a binary neural network in accordance with a number of embodiments of the present disclosure.

FIG. 3 illustrates a flow diagram for generating a binary neural network in accordance with a number of embodiments of the present disclosure. The flow diagram can be implemented by a BNN generator 320 of control circuitry of a memory device.

The flow diagram of FIG. 3 describes the generating of the second BNN described in block 223 of FIG. 2. The flow diagram shows linear layers (Lin) 331-1, 331-2, 331-3 of the BNN generator 320. The flow diagram also shows drop out layers (drop out) 332-1, 332-2. The flow diagram further shows a binarization layers (Bin) 333-1, 333-2. The flow diagram also shows an argmax layer (argmax) 334.

The BNN generator 320 can receive a plurality of weights ($X_k$) of a first BNN as described in FIG. 2. The plurality of weights can be provided as a vector or matrix. The plurality of weights can be processed by the linear layer 331-1. The linear layer 331-1 can generate a vector ($y_k$) that can be provided as an input to the dropout layer 332-1. The dropout layer 332-1 can generate a vector ($z_k$) that can be provided as an input to the binarization layer 333-1. The dropout layer 332-1 can generate a plurality of weights ($X_{k+1}$) that can be provided to the linear layer 331-2, and so forth.

The binarization layer 333-2 can output a plurality of weights ($X_d$) that can be provided to the linear layer 331-3. The linear layer 331-3 can output a vector ($y_d$) to the argmax layer 334. The argmax layer 334 can output the second BNN in the form of the weights (O).

The linear layers 331-1, 331-2, 331-3 can perform linear transformations on a plurality of weights that are provided as inputs to the linear layers 331-1, 331-2, 331-3. The dropout layers 332-1, 332-2 can reduce the overfitting of the second BNN. The dropout layers 332-1, 332-2 can drop some of the weights and replace the dropped weights with predefined values. As used herein, dropping a weight can include removing the weight, deleting the weight, or refraining from using the weight. The predefined values can be {g1, g2}, for example.

The weights selected to be dropped can be selected with a particular probability. That is, one of the possible outcomes of dropping or not dropping a weight can be selected with a particular probability.

Dropping a weight can describe that a value of the weight is not used or that the value of the weight is substituted with a different value. For instance, the values that the selected weights are going to be replaced with can be selected with a particular probability. That is, a value of a weight can be replaced with one of g1 and g2. One of the values g1 and g2 can be selected with a particular probability. In various examples, different types of layers can be utilized, other than dropout layers, to reduce over-fitting. For instance, instead of a dropout layer a pruning layer can be utilized to prevent overfitting of the second BNN. As used herein, pruning can include removing a weight without replacing the weight with a value.

The binarization layers 333-1, 333-2 can simply a full precision convolution at the cost of accuracy. For example, the binarization layers 333-1, 333-2 can generate binary weights from real value weights. The argmax layer 334 can provide a maximum output given the input. That is, the argmax layer 334 can select an index of a maximum value given the input received by the argmax layer 334.

In various examples, the linear layers 331-1, 331-2 and the dropout layers 332-1, 332-2 can be organized into blocks. As used in FIG. 3, blocks describe a logical grouping. The linear layer 331-1, the dropout layer 332-1, and the binarization layer 333-1 can constitute a first block. The linear layer 331-2, the dropout layer 332-2, and the binarization layer 333-2 can constitute a second block. The linear layer 331-3 and the argmax layer 334 can constitute output layers.

The linear layers 331-1, 331-2, 331-3 can be defined as $y_k = A_k x_k + b_k$ where $A_k$ and $b_k$ comprise vectors having binary values $\{0, 1\}$ and $x_k$ are weights having binary values $\{0, 1\}$. The dropout layers 332-1, 332-2 can perform dropout on $y_k$. The dropout layers 332-1, 332-2 can output the vector or matrix $z_k$. The binarization layers 333-1, 333-2 can be defined as $x_{k+1} = \text{sign}(z_k)$ where sign( ) is an operation that generates a g1 or g2-value from $z_k$ based on a sign of the values of $z_k$.

FIG. 4 illustrates a block diagram of memory cells for executing a binary neural network. Multiple layers of the second BNN can be implemented to process and input and output a classification.

The resistive components 445 can be programmed by providing inputs via the sense lines 444 and the access lines 442. Operations can be performed by providing inputs through one of the sense lines 444 or the access lines 442. For example, with respect to FIG. 3, inputs can be provided via the access lines 443 to the memory cells 444, which store the weight matrix x of the second BNN. A vector can be the output from the pulse generators 441. The pulse generator 441 can be a stochastic pulse generator, for example. Providing the inputs to the memory cells 444 effectively multiplies the input (e.g., input vector) by the weight matrix x which results in the generation of an output (e.g., output vector). The weight matrix x can be stored in the memory cells 444 using the deterministic pulse generators 448. Deterministic pulse generators, including the pulse generator 441 and the pulse generator 448, can provide inputs concurrently to store the weight matrix x in the memory cells 444. The deterministic pulse generator can provide inputs via sense lines 443 while a different deterministic pulse generator provides inputs via the access line 442.

The memory cells 444 can be resistive memory cells. The resistive memory cells 444 can comprise terminals that couple the memory cells 444 to the sense lines 443 and the access lines 442. The terminals of the memory cells 444 can be coupled to each other via a resistive element 445. The resistive element 445 can be a resistance variable material (e.g., a material programmable to multiple different resistance states, which can represent multiple different data states) such as, for example, a transition metal oxide material, or a perovskite including two or more metals (e.g., transition metals, alkaline earth metals, and/or rare earth metals). Other examples of resistance variable materials that can be included in the storage element of resistive memory cells can include various materials employing trapped charges to modify or alter conductivity, chalcogenides formed of various doped or undoped materials, binary metal oxide materials, colossal magnetoresistive materials, and/or various polymer based resistive variable materials, among others. Embodiments are not limited to a particular resistance variable material or materials. In various instances, the conductance of the memory cells 444 can be programmed by programming the resistive element 445. For instance, control circuitry of a memory device can program the resistive element 445. Actions performed by a memory device, the memory array 410, the memory cells 444, a pulse generator (e.g., deterministic pulse generator 448, and stochastic pulse generator 441), and/or analog-to-digital converters 446 can be said to be performed by or caused to be performed by a control circuitry of the memory device.

The conductance of the memory cells 444 can represent weight values of a BNN. For example, the conductance of the memory cells 444 can represent weight values of a layer of the BNN. As used herein, the terms weights and weight values are used interchangeably.

The memory cells 444 can be used in the performance of operations. The memory cells 444 can be controlled to perform matrix multiplication in parallel and locally to the memory device hosting the memory array 410. Matrix multiplication can be performed utilizing inputs and a plurality of weight values. The inputs can be provided as an input vector. The plurality of weight values, which are represented by the conductance of the memory cells 444, can be provided as a weight matrix. FIG. 4 shows that the inputs can be provided via the access lines 442 and/or the sense lines 443. Each of the access lines 442 can provide a portion of the input (one of the input values). For example, a first access line can provide a first input value, . . . , and a last access line can provide the last input value. The inputs are provided by pulse generators 441 and the pulse generator 448.

The inputs can be multiplied with a weight matrix comprising the weight values stored by the memory array 410 and which are represented by the conductance of the memory cells 444.

In various examples, multiple instances of matrix multiplication can be performed in the memory array 410. A single instance of matrix multiplication can also be performed in the memory array 410.

As such, the memory array 410 and/or banks of the memory array 410 can be described as processing data. As used herein, processing includes utilizing memory (e.g., memory array and/or a bank of memory) to generate an output responsive to receipt of an input. The output can be generated using the resistance of the memory cells of the memory and the input to the memory.

The pulse generators 441, 448 can comprise hardware to generate voltage pulses. In various example, the pulse generators 441, 448 can receive a voltage input or a plurality of voltage inputs and can generate a plurality of voltage pulses. The pulse generators 441, 448 can implement a drop out scheme which can be used along with the generation of random numbers to sample.

The outputs can be provided via the sense lines 443. The outputs can be interpreted as current signals. The outputs can be provided to analog-to-digital converter (ADC) 446. The ADC 446 can receive a current and can output a voltage. The ADC 446 can measure the current provided by the sense lines 443. The output of the ADC 446 can be a voltage signal that can be stored in registers 447 of the memory device or which can be provided directly to a voltage pulse generator coupled to a different memory array or a same memory array pending reprogramming of the memory array 410. In various instances, the ADC 446 can comprise the registers.

The memory array 410 can be used to generate an output which can be converted to a voltage signal by the ADC 446. The voltage signal can be stored in registers 446 of the memory device. The memory array 410 can then be reprogramed by resetting the conductance of the memory cells 444. Resetting the conductance of the memory cells 444 can reprogram the memory array 410 to function as a different layer of the BNN. The output stored in the registers 446 can be provided as an input to the pulse generators 441, 448 which can provide an input to the memory array 410. In various instances, the output of the ADC 446 can be provided to a data path 447 of the memory device. The data path 447 can include FlipFlop circuitry and/or sensing circuitry including a sense amplifier, among other possible components of the data path 447.

The memory cells 444 can store the values g1 and g2. The values g1 and g2 can be conductance thresholds to mimic a 0-value and a 1-value, correspondingly. The benefit of utilizing the g1 and g2-values is the ability to perform multiplication operations utilizing the memory cells 444. As used herein, g1 and g2 represent values that correspond to conductance thresholds that can be implemented in memory cells 444. Both g1 and g2 are non-zero values. Accordingly, both g1 and g2 are not equal to a 0-value but may be greater than a 0-values such that 0<g1<g2. In various instances, g2 can be equal to or less than a 1-value such that g1<g2≤1.

In various examples, the second BNN can be stored in the memory cells 444 by storing the weights of the second BNN in the memory cells 444. For example, the weights of the second BNN can be referred to as a plurality of elements. As such, the elements can be stored in the memory cells 444 as a first resistive state and a second resistive state of the memory cells 444 where the resistive states correspond to g1 and g2. The resistive states corresponding to the g1 and g2-values can be different than a resistive state corresponding to a 0-value. For example, a first resistive state corresponding to the g1 and a second resistive state corresponding to g2 are greater than a third resistive state that correspond to a 0-value. The first resistive state and the second resistive state can also be less than a fourth resistive state that corresponds to a 1-value. In various instances the second resistive state can be equal to a fourth resistive state. The first resistive state can be less than the second resistive state. Although the examples described herein are provided in the context of the values {g1, g2}, more than two non-zero values can be used to implement an ANN. The more than two non-zero values (e.g., a plurality of non-zero values) can be used to perform multiplication operations utilizing the memory cells 444 given that all of the non-zero values are greater than a zero-value.

Figure 5:
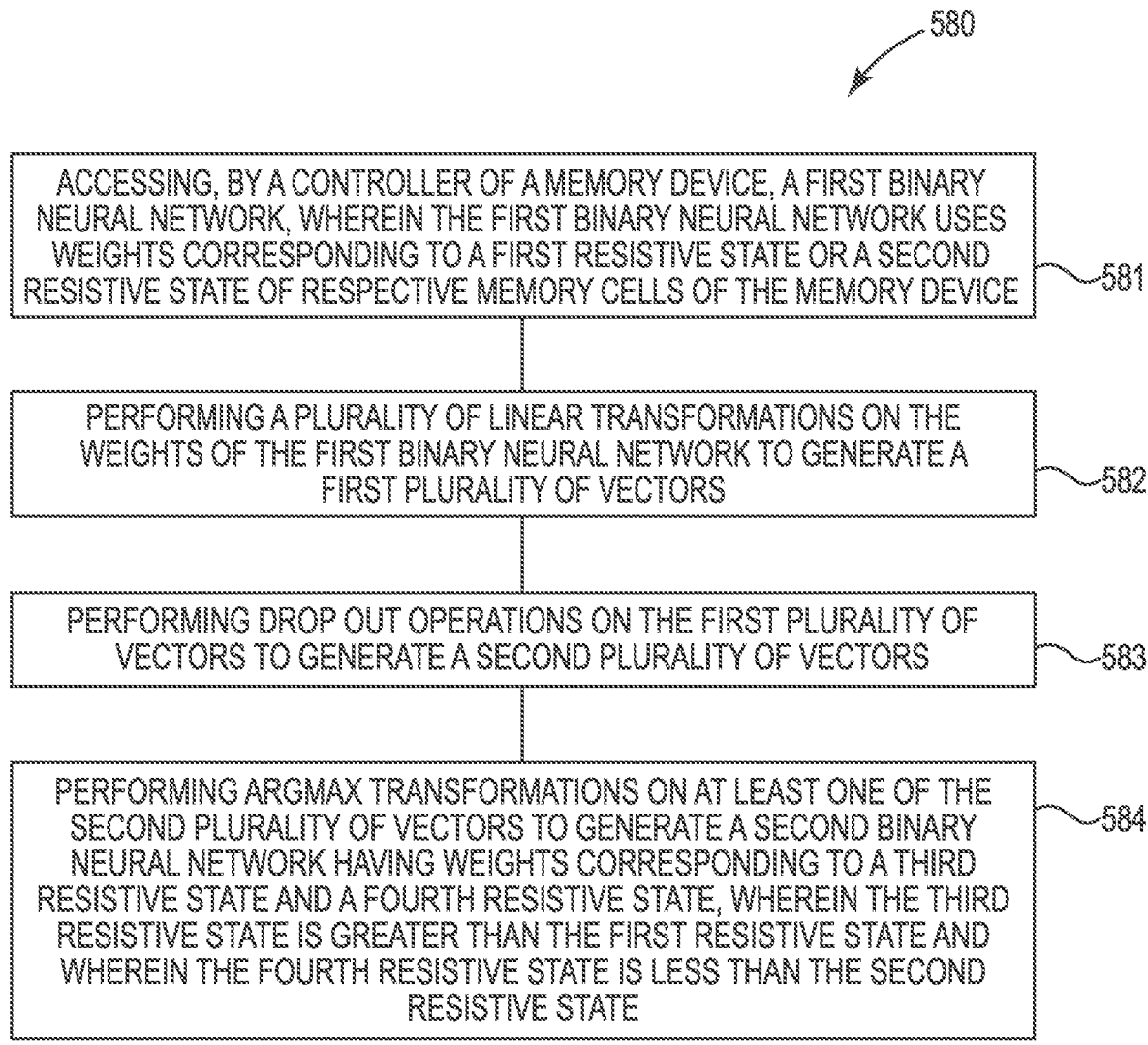
FIG. 5 illustrates an example flow diagram of a method for implementing a binary neural network in memory in accordance with a number of embodiments of the present disclosure.

FIG. 5 illustrates an example flow diagram of a method 580 for implementing a Binary neural network in memory in accordance with a number of embodiments of the present disclosure. The method 580 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 580 is performed by the control circuitry (e.g., controller) 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 581, a first binary neural network can be accessed by a controller of a memory device wherein the first binary neural network uses weights corresponding to a first resistive state or a second resistive state of respective memory cells of the memory device. Accessing a neural network can include receiving the weights from the neural network from a memory array or from a host coupled to a memory device comprising the memory array.

At block 582, a plurality of linear transformations can be performed on the weights of the first binary neural network to generate a first plurality of vectors. The linear transformations can be performed by a controller of the memory device. For example, the linear transformations can be performed by a BNN generator of the controller of the memory device.

At block 583, drop out operations can be performed on the first plurality of vectors to generate a second plurality of vectors. The drop out operations can be performed by a dropout layer of the controller of the memory device. At block 584, argmax transformations can be performed on at least one of the second plurality of vectors to generate a second binary neural network having weights corresponding to a third resistive state and a fourth resistive state, wherein the third resistive state is greater than the first resistive state and wherein the fourth resistive state is less than the second resistive state.

A binarization transformation can be performed on the second plurality of vectors to generate an input to a portion of the plurality of linear transformations. For example, a first binarization transformation can be performed to provide an input to a second linear transformation operation where the first linear transformation operation was performed prior to the first binarization transformation was performed. Further, a last binarization transformation can be performed to provide an input to a last linear transformation.

In various examples, the drop out operations can be performed by zeroing portions of the first plurality of vectors. The particular values of the vector that are zeroed out can be done so with a particular probability. The plurality of drop out operations and linear transformations can be performed in blocks. Each block can comprise one of the linear transformations and one of the drop out operations. For example, each of the linear transformations can be performed in a linear layer of the controller of the memory device. Each of the drop out operations can be performed by a dropout layer of the controller. Each of the binarization operations can be performed by a binarization layer of the controller. Each block can be comprised of a linear layer, a dropout layer, and a binarization layer. For example, a first linear layer, a first dropout layer, and a first binarization layer can comprise a first block while a second linear layer, a second dropout layer, and a second binarization layer can comprise a second block.

In various instances, a controller of the memory device can generate a first binary neural network, the first binary neural network including a first plurality of elements each storable in a respective memory cell as a first resistive state or a second resistive state of the respective memory cell. The controller can also generate a secondary binary neural network based on the first binary neural network, the second binary neural network including a second plurality of elements each stored in a respective memory cell as a third resistive state or a fourth resistive state of the memory cells, wherein the third state and the fourth state are different than the first resistive state. The second binary neural network can be executed on the array.

The first binary neural network can be generated by quantizing an original neural network. Quantizing the original neural network can comprise providing a binary representation of weights of the original neural network using the first resistive state and the second resistive state. The original neural network can be a convolution neural network.

The third resistive state and the fourth resistive state can correspond to the first resistive state and the second resistive state, correspondingly, where the third resistive state and the fourth resistive state are not equal to the first resistive state. The second binary neural network can be generated to include a binary representation of weights of the first binary neural network but using the third resistive state and the fourth resistive state. For instance, the third resistive state and the fourth resistive state can be used instead of the first resistive state and/or the second resistive state In various instances, at least one of the first resistive state and the second resistive restate can correspond to a 0-value. For instance, the first resistive state can correspond to a 0-value while the second resistive state corresponds to a 1-value. The third resistive state and the fourth resistive state can correspond to non-zero values. For example, the third resistive state can correspond to a non-zero value and a non-one value while the fourth resistive state corresponds to a 1-value.

Generating a second binary neural network can include generating a first binary neural network having a first plurality of weights corresponding to a first resistive state or a second resistive state and generate a secondary binary neural network. The second binary neural network can be generated having a second plurality of weights corresponding to a plurality of different resistive states, from the first binary neural network by performing a plurality of drop out operations. The second binary neural network can be executed on the resistive or phase-change memory cells.

The second binary neural network can be generated having the second plurality of weights corresponding to the plurality of different resistive states including a third resistive state and a fourth resistive state where the fourth resistive state corresponds to the second resistive state. Although the third resistive state and the fourth resistive state are utilized, more resistive state can be utilized to generate the second binary neural network.

The second binary neural network can be executed by performing a plurality of multiplication operations utilizing the resistive or phase-change memory cells and the plurality of resistive states. The plurality of multiplication operations may not able to be performed utilizing the first resistive state. The second binary neural network can also be executed by programming the resistive or phase-change memory cells to have the plurality of different resistive states including the third resistive state and the fourth resistive state.

Figure 6:
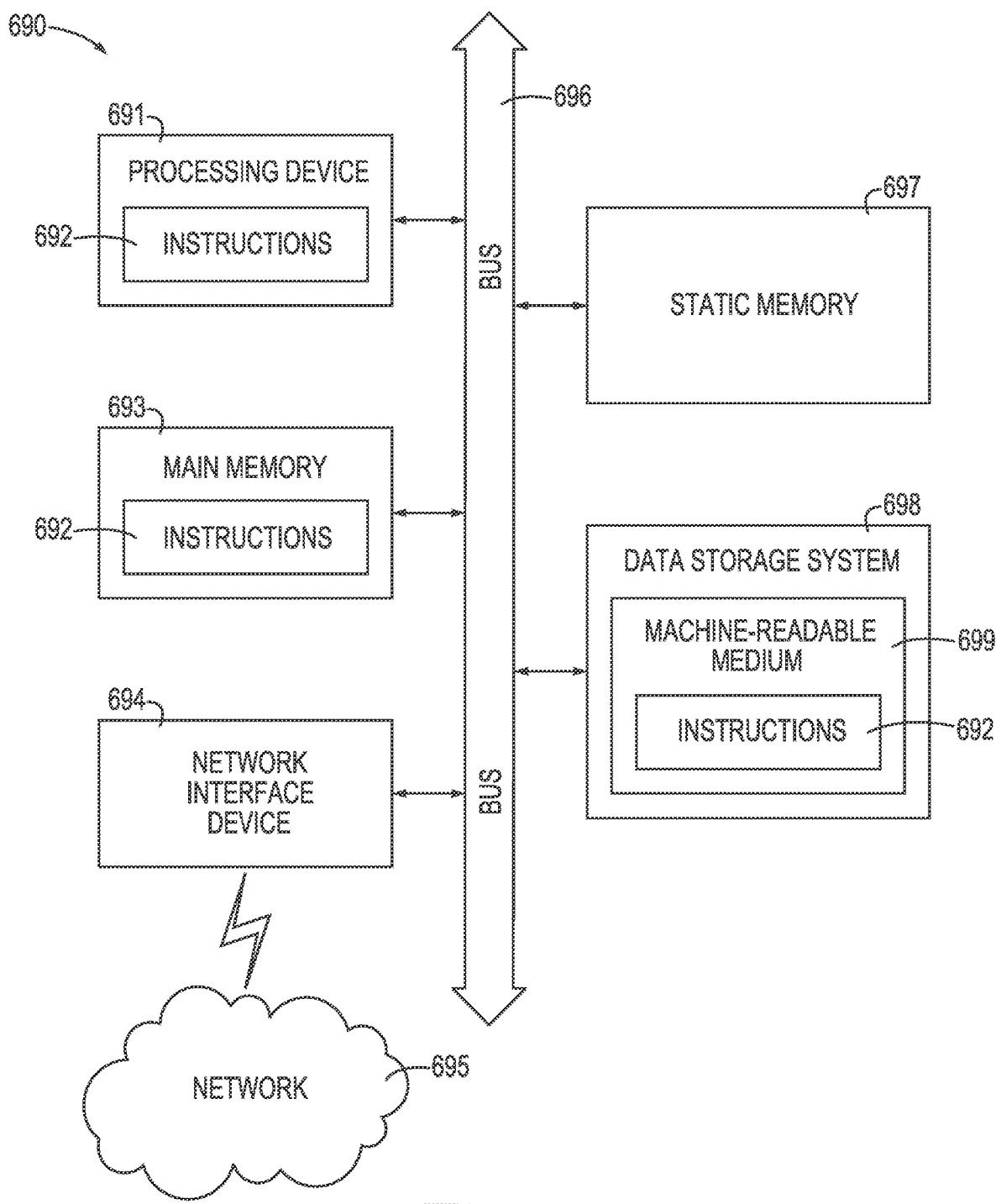
FIG. 6 illustrates an example machine of a computer system within which a set of instructions, for causing the machine to perform various methodologies discussed herein, can be executed.

FIG. 6 illustrates an example machine of a computer system 690 within which a set of instructions, for causing the machine to perform various methodologies discussed herein, can be executed. In various embodiments, the computer system 690 can correspond to a system (e.g., the computing system 100 of FIG. 1) that includes, is coupled to, or utilizes a memory sub-system (e.g., the memory device 103 of FIG. 1) or can be used to perform the operations of a controller (e.g., the controller circuitry 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 690 includes a processing device 691, a main memory 693 (e.g., read-only memory (ROM), flash memory, dynamic random access memory (DRAM) such as synchronous DRAM (SDRAM) or Rambus DRAM (RDRAM), etc.), a static memory 697 (e.g., flash memory, static random access memory (SRAM), etc.), and a data storage system 698, which communicate with each other via a bus 696.

Processing device 691 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 691 can also be one or more special-purpose processing devices such as an application specific integrated circuit (ASIC), a field programmable gate array (FPGA), a digital signal processor (DSP), network processor, or the like. The processing device 691 is configured to execute instructions 692 for performing the operations and steps discussed herein. The computer system 690 can further include a network interface device 694 to communicate over the network 695.

The data storage system 698 can include a machine-readable storage medium 699 (also known as a computer-readable medium) on which is stored one or more sets of instructions 692 or software embodying any one or more of the methodologies or functions described herein. The instructions 692 can also reside, completely or at least partially, within the main memory 693 and/or within the processing device 691 during execution thereof by the computer system 690, the main memory 693 and the processing device 691 also constituting machine-readable storage media.

In one embodiment, the instructions 692 include instructions to implement functionality corresponding to the host 102 and/or the memory device 103 of FIG. 1. While the machine-readable storage medium 699 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   an array of memory cells;
   a controller coupled to the memory array and configured to:
   quantize an original neural network having non-binary elements to generate a first binary neural network including a first plurality of elements each having a value of one or zero;
   generate a secondary binary neural network based on the first binary neural network by:
   performing a plurality of linear transformations on weights of the first binary neural network to generate a first plurality of vectors;
   performing drop out operations on the first plurality of vectors to generate a second plurality of vectors;
   performing argmax transformations on at least one of the second plurality of vectors;
   wherein the second binary neural network including a second plurality of elements each having a respective non-zero value corresponding to a resistive state storable in a memory cell of the array of memory cells;
   store each of the second plurality of elements as a first resistive state or a second resistive state in the array of memory cells; and
   execute the second binary neural network on the array by performing vector-matrix multiplication using the resistive states of the memory cells.

2. The apparatus of claim 1, wherein the controller is further configured to provide a binary representation of non-binary elements of the original neural network to quantize the original neural network.

3. The apparatus of claim 2, wherein the original neural network is a convolution neural network.

4. The apparatus of claim 1, wherein the elements comprise the weights.

5. The apparatus of claim 1, wherein the respective non-zero values of the second binary neural network are less than one.

6. The apparatus of claim 1, wherein one of the respective non-zero values of the second binary neural network is equal to one.

7. A method, comprising:
   quantizing an original neural network having non-binary elements to generate a first binary neural network;
   accessing, by a controller of a memory device, the first binary neural network, wherein the first binary neural network uses weights each having a value of one or zero;
   performing a plurality of linear transformations on the weights of the first binary neural network to generate a first plurality of vectors;
   performing drop out operations on the first plurality of vectors to generate a second plurality of vectors;
   performing argmax transformations on at least one of the second plurality of vectors to generate a second binary neural network having weights each having a respective non-zero value corresponding to a resistive state storable in a memory cell of the array of memory cells, wherein the non-zero value is greater than a value of zero and less than a value of one;
   storing each of the second plurality of vectors in memory cells of an array as a first resistive state or a second resistive state in the array of memory cells; and
   executing the second binary neural network on the memory cells of the array by performing vector-matrix multiplication using the resistive states of the memory cells.

8. The method of claim 7, further comprising perform a binarization transformation on the second plurality of vectors to generate an input to a portion of the plurality of linear transformations.

9. The method of claim 7, further comprising performing the drop out operations by zeroing portions of the first plurality of vectors.

10. The method of claim 9, further comprising zeroing portions of the first plurality of vectors with a probability.

11. The method of claim 7, wherein the memory array is a resistive or phase-change memory array.

12. The method of claim 7, further comprising performing the plurality of linear transformations and the drop out operations in blocks wherein each block comprises one of the linear transformations and one of the drop out operations.

13. An apparatus, comprising:
an array of resistive or phase-change memory cells;
a controller coupled to the array and configured to:
quantize an original neural network having non-binary elements to generate a first binary neural network having a first plurality of weights each having a value of one or zero;
generate a secondary binary neural network, having a second plurality of weights each having a respective non-zero value corresponding to a resistive state storable in a memory cell of the array of memory cells, from the first binary neural network by:
performing a plurality of linear transformations on the first plurality of weights of the first binary neural network to generate a first plurality of vectors;
performing a plurality of drop out operations on the first plurality of vectors to generate a second plurality of vectors; and
performing argmax transformations on at least one of the second plurality of vectors;
store each of the second plurality of weights as one of a plurality of different resistive states; and
execute the second binary neural network on the memory cells of the array, wherein the memory cells are the resistive or phase-change memory cells by performing vector-matrix multiplication using the resistive states of the memory cells.

14. The apparatus of claim 13, wherein the controller configured to generate the second binary neural network is further configured to generate the second binary neural network having the second plurality of weights corresponding to the plurality of different resistive states including a first resistive state and a second resistive state.

15. The apparatus of claim 13, wherein the controller is further configured to perform a plurality of multiplication operations utilizing the resistive or phase-change memory cells and the plurality of resistive states to execute the second binary neural network.

16. The apparatus of claim 15, wherein the plurality of multiplication operations is not able to be performed utilizing a resistive state corresponding to the zero value.

17. The apparatus of claim 13, wherein the controller is further configured to execute the second binary neural network by programming the resistive or phase-change memory cells to have the plurality of different resistive states.

\* \* \* \* \*